(12) United States Patent
Macgill et al.

(10) Patent No.: US 8,538,944 B1
(45) Date of Patent: Sep. 17, 2013

(54) RESOURCE CATCHMENT AREAS

(75) Inventors: James Robert Macgill, Chatham, NJ (US); Tamara I. Stern, New York, NY (US)

(73) Assignee: Google Inc., Mountain View, CA (US)

( * ) Notice: Subject to any disclaimer, the term of this patent is extended or adjusted under 35 U.S.C. 154(b) by 49 days.

(21) Appl. No.: 13/104,651

(22) Filed: May 10, 2011

(51) Int. Cl.
*G06F 17/30* (2006.01)

(52) U.S. Cl.
USPC .......................... 707/706; 707/721; 707/749

(58) Field of Classification Search
USPC .......................................... 707/706, 721, 749
See application file for complete search history.

(56) References Cited

U.S. PATENT DOCUMENTS

| | | | | |
|---|---|---|---|---|
| 2006/0229807 | A1* | 10/2006 | Sheha et al. | 701/209 |
| 2009/0234825 | A1* | 9/2009 | Xia et al. | 707/4 |
| 2011/0320429 | A1 | 12/2011 | Doig et al. | |
| 2012/0066066 | A1 | 3/2012 | Jain et al. | |
| 2012/0116678 | A1 | 5/2012 | Witmer | |

* cited by examiner

*Primary Examiner* — Hung Q Pham
(74) *Attorney, Agent, or Firm* — Bracewell & Giuliani, LLP

(57) ABSTRACT

Methods, systems, and apparatus, including computer programs encoded on a computer storage medium, for selecting search results. In one aspect, a method includes receiving a first search query that is associated with a particular query location. A first search result that is responsive to the first search query is selected. The first search result references a first resource that has a first catchment area. The first catchment area includes the particular query location. A second search result that is responsive to the first search query is selected. The second search result references a second resource that has a second catchment area. The second catchment area does not include the particular query location. The second catchment area does include a business location of the first resource. First data specifying selection of the first search result and the second search result in response to the search query are provided.

18 Claims, 7 Drawing Sheets

RESOURCE CATCHMENT AREAS

BACKGROUND

This specification relates to data processing and indexing.

The Internet provides access to a wide variety of resources such as video or audio files, web pages for particular subjects, book articles, or news articles. A search system can identify resources in response to a text search query that includes one or more search phrases (i.e., one or more words). The search system ranks the resources based on their relevance to the search query and on measures of quality of the resources and provides search results that link to the identified resources. The search results are typically ordered for viewing according to the ranking.

Some search systems can obtain or infer a query location (e.g., a city, state, zip code, or other indicia of locale) that is associated with a search query. A query location that is associated with a search query is a geographic location of the user device from which the search query was received or a geographic location that is specified by and/or inferred from the contents of the search query. For example, a search system can determine that the location of the user device from which the search query was received is the query location that is associated with the search query. Similarly, a search system can parse the contents of the search query to obtain the query location that is associated with the search query. For example, the search system can parse a search query "coffee shop San Francisco," to identify San Francisco as the query location that is associated with the search query.

Using the query location, search systems can select resources having business locations that are within a threshold distance (e.g., 50 miles) of the query location as being responsive to the search query and provide search results that reference the selected resources. For example, in response to receiving the search query "coffee shop" and determining the location of the user device from which the search query was received, the search system provides search results that reference web pages for coffee shops that are located within a threshold distance (e.g., 50 miles) of the location of the user device. Similarly, in response to receiving the search query "coffee shop San Francisco," the search system may provide search results that reference web pages for coffee shops that are located within the threshold distance of San Francisco.

Providing search results that reference web pages (or other resources) for businesses (or other entities) that are located within the threshold distance of the query location increases the likelihood that the user is provided search results that satisfy the user's informational need. For example, a user that submits the search query "coffee shop" is more likely to travel to a coffee shop that is within the threshold distance of their current location (or a specified location) than a coffee shop that is outside of the threshold distance. Therefore, many users may be satisfied to receive search results referencing coffee shops that are within the threshold distance of the query location. However, users that submit other search queries, such as the search query "snow skiing," may be more satisfied if the search results include references to web pages for ski resorts that are beyond the threshold distance from the query location, since users overall may be willing to travel further than the threshold distance to visit a ski resort.

SUMMARY

In general, one innovative aspect of the subject matter described in this specification can be embodied in methods that include the actions of receiving a first search query that is associated with a particular query location; selecting a first search result that is responsive to the first search query, the first search result referencing a first resource having a first catchment area that includes the particular query location; selecting a second search result that is responsive to the first search query, the second search result referencing a second resource having a second catchment area that does not include the particular query location, the second catchment area including a business location of the first resource; and providing first data specifying selection of the first search result and the second search result in response to the search query. Other embodiments of this aspect include corresponding systems, apparatus, and computer programs, configured to perform the actions of the methods, encoded on computer storage devices.

These and other embodiments can each optionally include one or more of the following features. Selecting a second search result can include selecting the second search result based on the second resource having at least a threshold similarity score relative to the first resource. Each catchment area can include a plurality of catchment locations for a resource. Each catchment location can be a query location that is associated with at least one user selection of a search result that references the resource.

Selecting a second search result can include adjusting a result score for the second search result based on the second catchment area not including the particular query location.

The first catchment area can be a catchment area that does not include a business location of the second resource. Methods can further include the actions of receiving a second search query that is associated with a different query location; selecting the second search result as responsive to the second search query, the second search result being selected, at least in part, based on the second catchment area including the different query location; determining that the first catchment area does not include the different query location; and providing second data specifying selection of the second search result in response to the second search query, wherein the second data does not include data identifying the first search result.

Methods can further include the actions of accessing search log data specifying that the first resource is referenced by search results that were presented to users, query locations for the first resource, and whether the users interacted with the search results; determining the catchment area for the first resource based on the search log data; and indexing the first resource according to its catchment area.

Methods can further include the actions of accessing search log data specifying that the second resource is referenced by search results that were presented to users, query locations for the second resource, and whether the users interacted with the search results; determining the catchment area for second first resource based on the search log data; and indexing the second resource according to its catchment area.

Particular embodiments of the subject matter described in this specification can be implemented so as to realize one or more of the following advantages. Search query processing can be performed more efficiently by filtering candidate search results using resource catchment areas. For example, the candidate search results can be limited to those search results that reference resources having catchment areas that include either the query location or a business location of another resource having a catchment area that includes the query location. Therefore, the computing resources required to select final search results that are presented to users can be reduced relative to the computing resources that would otherwise be required to select final search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Resources are indexed according to catchment areas for the resources. A catchment area for a resource is a geographic region that includes query locations that are associated with (e.g., indexed according to and/or stored at memory locations assigned to) a resource (e.g., a web page) with which a user interacted. For example, a catchment area for a web page can be a geographic area that includes each geographic location that is specified in search queries that were submitted by users that clicked on search queries that referenced the web page. Continuing with this example, the catchment area for the web page can also include geographic locations of user devices from which the search queries were received.

Once a catchment area has been determined for a particular resource, the resource can be indexed according to the catchment area so that the resource can be identified as responsive to search queries that were received from user devices located in the catchment area, or be selected as responsive to search queries that specify a geographic location that is included in the catchment area. For example, if the search query "coffee shops" is received from a user device that is located in San Francisco, the resources referenced by search results provided to the user device can be resources (e.g., web pages) for coffee shops that have catchment areas that include San Francisco.

Figure 1:
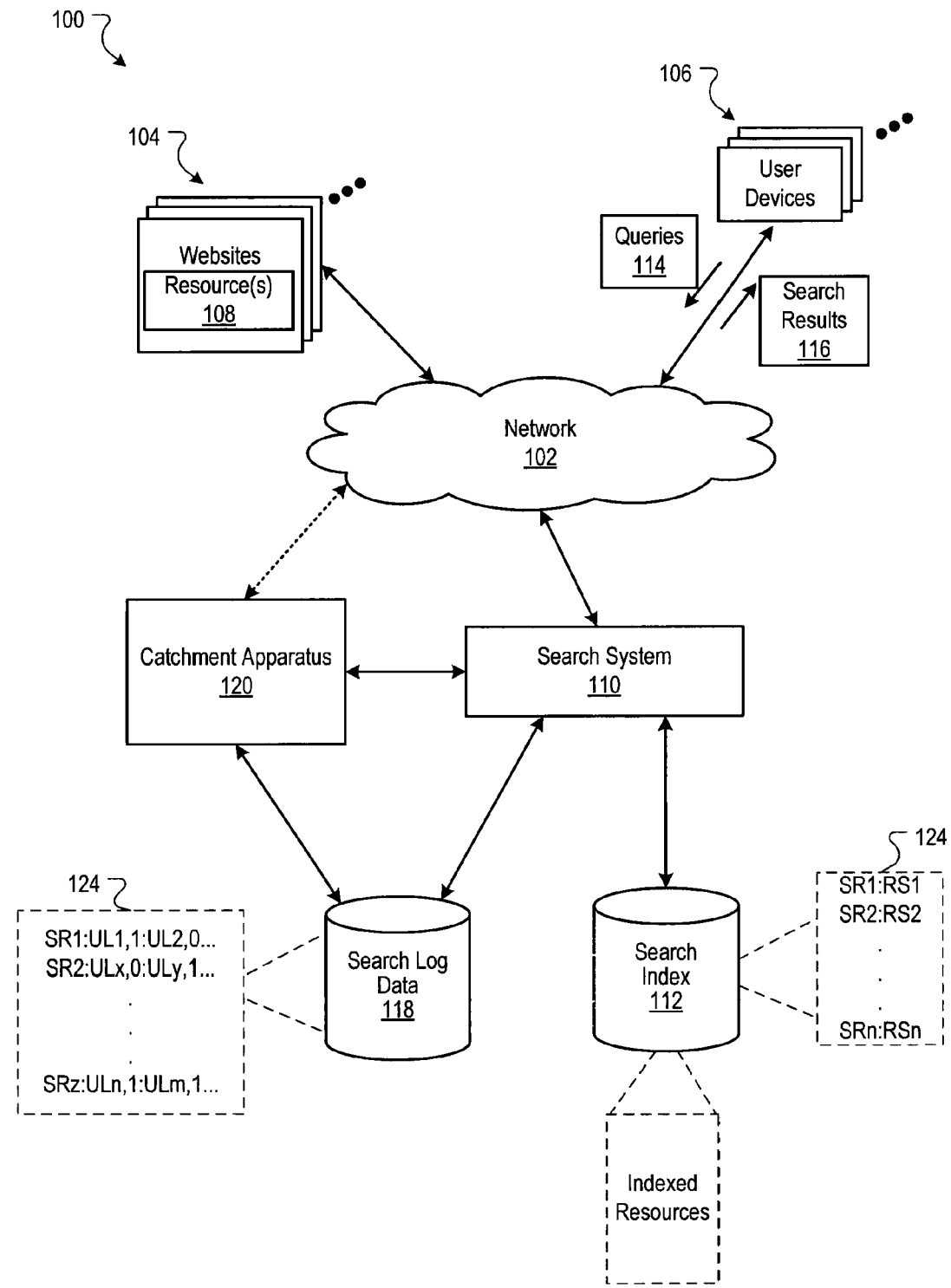
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands publishers and user devices 106.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided by the web site 104 over the network 102 and that is associated with a resource address. Resources 108 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 108, the search system 110 identifies the resources 108 by crawling and indexing the resources 108 provided by the publishers 104. Data about the resources 108 can be indexed based on the resource 108 to which the data corresponds. The resources can also be indexed according to a business location (i.e., a geographic location) for the resource. The business location for the resource is a location of a business (or another entity) for which the resource is provided (i.e., the business that is associated with the resource). The business location for a resource can be determined based on contents of the resource. For example, a business address may be specified at a "Contact Us" web page for the business for which the resource is provided. Alternatively, the business location may be derived based on a phone number, zip code, or other indicia of location for the business.

The business location for the resource can also be determined based on a map data that specify a geographic location for the business. For example, a location of a business may be specified on an interactive map using map data that specify a location (e.g., geographic coordinates or an address) for the business. Using the map data, the location of the business, as specified by the map data, can be used as the business address for a resource that is associated with the business. The indexed and, optionally, cached copies of the resources 108 are stored in a search index 112.

The user devices 106 submit search queries 114 to the search system 110. In response, the search system 110 accesses the search index 112 to identify resources 108 that are determined to be relevant to the search query 109 (i.e. candidate resources), for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page. As described above, resources that are responsive to a search query may be selected based, in part, on a query location for the search query.

User devices 106 receive the search results 116 and render the search results 116, for example, in the form of one or more web pages, for presentation to users. In response to the user selecting (e.g., clicking) a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions and result data (i.e., data specifying search results that were provided in response to the search queries and/or resources that were referenced by the search results) are stored in a data store such as the search log data store 118. Each presentation of a search result in response to a search query is referred to as an impression for the resource that is referenced by the search result. For example, if a particular resource is referenced by search results in response to 10,000 search queries, the resource is considered to have an impression count of 10,000 impressions.

Interaction data specifying user actions taken in response to presentation of search results 116 are also stored in a data store such as the search log data store 118. The interaction data can specify whether a particular search result was selected (e.g., clicked) or wasn't selected by a user, and can also specify the resource that was referenced by the particular search result. In some implementations, location data specifying a query location for the search query that was submitted by the user can also be stored in the search log data store 118 and associated with (i.e., indexed according to or stored at a memory location assigned to) the resources referenced by the search result that the user selected. The data stored in the search log data store 118 is referred to collectively as search log data, and can be used to map search queries 114 submitted during search sessions to resources 108 that were identified in search results 116, actions taken by users, and query locations for the search queries. As described in more detail below, the search log data can be used to determine catchment areas for resources (e.g., web pages) and filter a candidate set of responsive resources based on query locations for the resources 108.

Search results 116 that reference resources 108 are generally selected to be provided to a user device 106 in response to a search query 114 based on result scores. Result scores are scores that represent a measure of relevance (i.e., a predicted relevance) of the resource 108 to a search query. For example, a result score for a resource 108 can be computed based on an information retrieval ("IR") score corresponding to the resource 108, and, optionally, a quality score of the resource 108 relative to other available resources. A presentation order for the search results 116 can be selected based on the result scores. In turn, data that causes presentation of the search results 116 according to the presentation order can be provided to the user device 106.

A query location can also be used to adjust result scores. For example, the result scores for resources having business locations that are more proximate to a query location can be increased relative to result scores for resources having business locations that are less proximate to the query location. Additionally, the search results that are provided in response to the search query can be filtered to include only those search results that reference a resource having a business location that is within a threshold distance of the query location. For example, the search results provided can be limited to search results that reference web pages having business locations that are within 50 miles of the query location. In some implementations, the resources that are determined to be responsive to a particular search query (candidate resources) are only those resources that have a business location that is within the threshold distance of the query location.

Using proximity boost factors (e.g., values by which result scores are adjusted) and/or filtering search results that reference resources (or the resources themselves) based on the proximity of the business locations of the resources relative to the query location can help increase user satisfaction with search results by increasing the likelihood that resources having business locations near the query location are referenced by the search results that are presented to the user. Utilizing boost factors and filtering criteria, as described above, presumes that users prefer receiving search results that reference resources having business locations near the query location over receiving search results that reference resources that are further form the query location. For example, users from San Francisco that submit the search query "coffee shop" generally prefer to receive search results that reference resources for coffee shops that are in (or within a threshold distance of) San Francisco. In this example, using a threshold distance from the user's location (e.g., 50 miles) to filter the search results (or candidate resources) can result in improved user satisfaction with the search results, for example, by increasing the likelihood that the user is presented search results that satisfy the user's informational need.

In another example, the threshold distance of 50 miles can be used to filter search results that reference resources that are responsive to the search query "Ski San Francisco." In this example, the search results presented to the user may include a search result referencing a resource for a ski equipment shop that is located 5 miles from the query location "San Francisco", but will not include a search result that references a resource for a Lake Tahoe ski resort that is 200 miles away from San Francisco. If the user in this example is interested in finding ski resorts that are more than 50 miles from San Francisco, the user may be required to submit a new search query (e.g., "Ski Resort Lake Tahoe") to be presented a search result that references the resource that was not referenced by the search results for "Ski San Francisco". However, using the filtering described above, the search results responsive to "Ski Resort Lake Tahoe," may only include search results that reference resources having a business location that is within the threshold distance (e.g., 50 miles) of Lake Tahoe. Therefore, the user may be required to submit even more search queries to satisfy their informational need.

Continuing with the example above, one way of increasing the likelihood that the user is presented with a search result that references the resource for the Lake Tahoe ski resort in response to the search query "Ski San Francisco" is to increase the threshold distance from the query location that is used to filter the search results (or candidate resources). However, the increased threshold distance may require more candidate resources to be processed for each query. For example, if the threshold distance is increased to 201 miles, resources for coffee shops that are within 201 miles of the query location would need to be processed to select search results that are provided to the user. This may require additional computational resources (relative to using a smaller threshold distance) and may result in presentation of search results that reference resources for coffee shops that are located in other cities (e.g., Lake Tahoe), which may not satisfy the user's informational need.

Another way to increase the likelihood that the user is presented with a search result that references the resource for the Lake Tahoe ski resort in response to the search query "Ski San Francisco" is to select resources that are responsive to a query location using catchment areas. As described above, a catchment area for a resource is a geographic region that includes query locations that are associated with (e.g., indexed according to and/or stored at memory locations assigned to) the resource. A query location of a search query can be associated with a resource in response to determining that a user interacted with (e.g., clicked) a search result that referenced the resource. For example, the query location San Francisco can be associated with a resource for a particular coffee shop when a search result that references the resource for the particular coffee shop is provided in response to the search query and subsequently clicked.

Each resource can have a catchment area that is independent of catchment areas for other resources. For example, the catchment area of a resource for a coffee shop may have a catchment area of 10 miles, while the catchment area of a resource for a particular ski resort may be 300 miles. As described in more detail below, once catchment areas have been determined for resources, the search results that are provided in response to a search query are those search results that reference resources having catchment areas that include the query location for the search query. In some implementations, as described in more detail with reference to FIGS. 5 and 6, the search results that are provided in response to a search query can include resources having catchment areas that do not include the query location, but do include a business location of one of the resources having catchment areas that include the query location.

To facilitate use of catchment areas for selecting search results, the environment 100 includes a catchment apparatus 120 that is configured to determine a catchment area for a particular resource based on search log data. For example, the catchment apparatus 120 analyzes search log data to identify impressions of a particular resource and to determine, based on the interaction data, whether users interacted with a search result that references the particular resource. For each impression, the catchment apparatus 120 determines a query location that is associated with the impression (i.e., a query location for the search query in response to which the search result was provided), and whether the user interacted with (e.g., clicked) a search result that references the resource. In turn, the catchment apparatus defines query locations that are associated with a user interaction with a search result that references a particular resource as catchment locations for the resource. Using these catchment locations, the catchment apparatus 120 defines a catchment area for the resource.

The catchment apparatus 120 can define the catchment area for a resource as a geographic region that includes all catchment locations for the resource, or as a proper subset of these catchment locations. For example, as described in more detail below, the catchment apparatus 120 can define the catchment area for a resource as a circular (or another shape) geographic area that is centered at (or near) the business location for the resource and having a radius that is proportional to the largest distance between the business location and a catchment location for the resource. In some implementations, the catchment apparatus 120 filters the catchment locations so that only catchment locations that satisfy specified location criteria and/or interaction thresholds (e.g., a click-through threshold such as a minimum click-through-rate or a minimum absolute quantity of search result click-throughs) are used to define the catchment area.

Location criteria specify location based attributes of catchment locations that are used to filter the catchment locations used to define a catchment area. For example, the location criteria can specify threshold travel times (e.g., a maximum of 30 minutes by car) between the business location and the catchment locations that are used to filter the catchment locations. Additionally, the location criteria can include obstacle data that specify obstacles (e.g., rivers, mountains, forests, or country borders) that may not be located between the business location and an edge of the catchment area. The catchment apparatus 120 can use the obstacle data, for example, to filter the catchment locations (i.e., remove catchment locations that are on an opposite side of an obstacle) and/or to define boundaries of the catchment area, as described in more detail below.

Once the catchment apparatus 120 has defined a catchment area for a resource, the resource is indexed according to the catchment area. For example, the catchment apparatus 120 can provide geographic identifiers (e.g., latitude and longitude coordinates, zip codes, state names, country names, or city names) that represent the catchment area for the resource, and to which the resource can be indexed. When a particular query location for a newly received search query is identified, the resources that are selected as responsive to the search query can be resources having catchment areas that include the particular query location. Thus, the resources that are referenced by search results provided selected in response to the search query are selected based on whether the query location is within the catchment area for the resource, rather than by selecting all resources having businesses locations that are within a threshold distance of the query location.

Figure 2A:
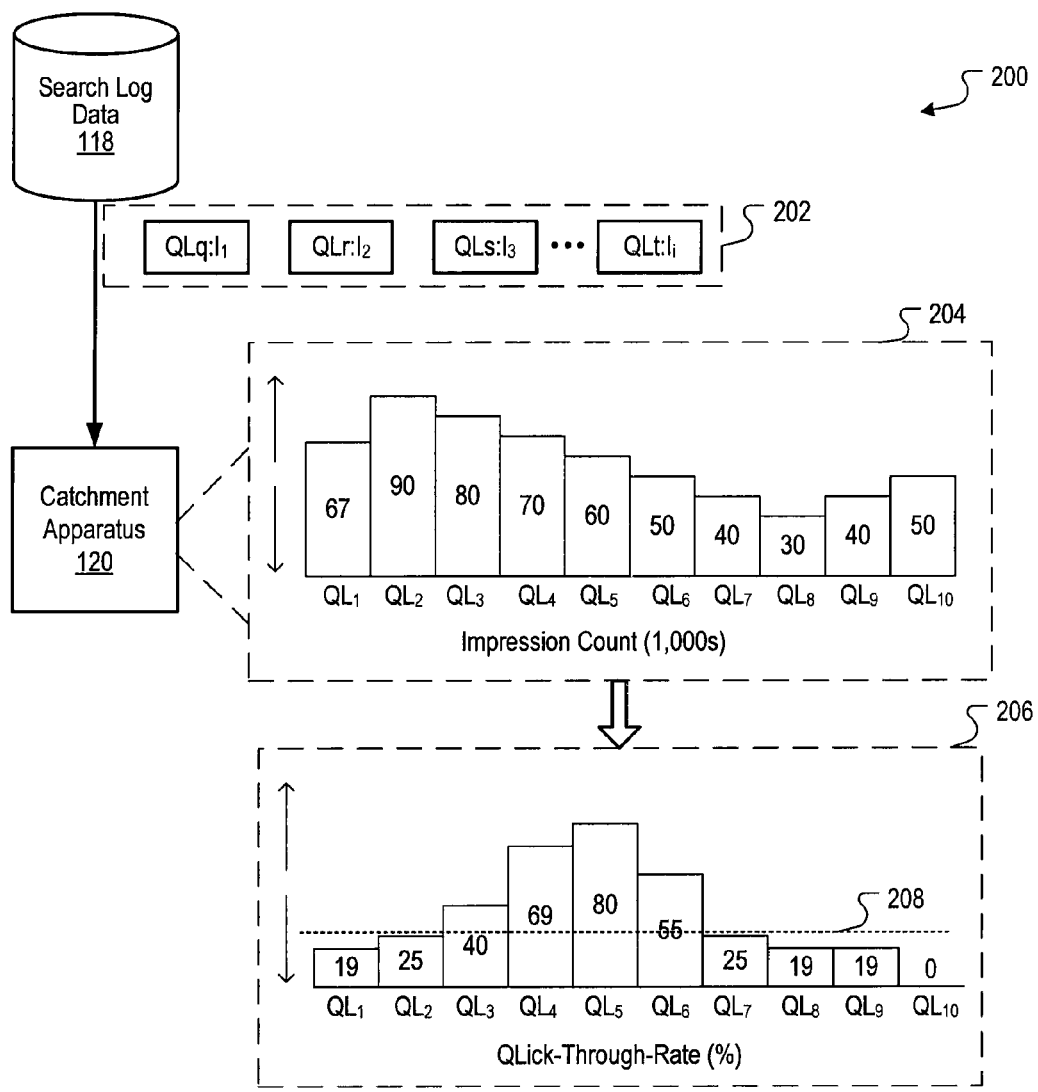
FIG. 2A is a block diagram illustrating example data flows for determining a catchment area for a resource.

FIG. 2A is a block diagram illustrating example data flows for determining a catchment area for a particular resource. The catchment apparatus 120 receives search log data 202 for a particular resource from the search log data store 118. The search log data 202 specifies query locations (e.g., QLq . . . QLt) that are associated with the particular resource and interaction data (I1 . . . Ii) specifying whether the user interacted with search results that reference the particular resource. For example, if a user clicked on a search result for the particular resource, the interaction data may specify a "1" representing the user click, while the user interaction data may specify a "0" if the user did not click on the search result. Other user interactions may also be tracked, such as a user positioning a pointer over a search result for at least a threshold time and/or short clicks (i.e., a clicking on a search result, but returning to the search result page within a threshold time).

Using the search log data 202, the catchment apparatus can aggregate impressions for the resource on a per-query-location basis. For example, assume that ten different query locations (e.g., QL1-QL10) were specified by the search log data for the resource. In this example, the total quantity of impressions that are associated with each of the ten query locations for the resource can be determined. Continuing with the example, according to the impression count graph 204, the resource was referenced by search results in response to 67,000 search queries that were associated with query location 1 (QL1), while being referenced in response to 90,000 search queries that were associated with query location 2 (QL2). The impression counts for the remaining query locations are presented in the impression count graph 204.

The catchment apparatus 120 can use the interaction data from the search log data along with the per-query-location impression data to compute a per-query-location click-through-rate for the resource. For example, assume that the interaction data specify that search results that reference the resource were clicked by 12,730 users when the search results were presented in response to search queries associated with query location 1. In this example, the query location 1 click-through-rate for the resource is 19%. Also assume that the interaction data specify that search results that reference the resource were clicked by 22,500 users when presented in response to search queries associated with query location 2, such that the query location 2 click-through-rate for the resource is 25%. The per-query-location click-through-rates for the remaining query locations are presented in the clickthrough-rate graph 206. Note that the click-through-rate for query location 10 is 0%, indicating that none of the users clicked search results that reference the resource when presented in response to search queries that were associated with query location 10.

In some implementations, the catchment apparatus 120 uses per-query-location click-through-rates (or absolute click quantities) to select catchment locations for the resource, and in turn, define the catchment area for the resource. For example, the catchment apparatus 120 may select all query locations that are associated with a user selection (e.g., a user click) of a search query referencing the resource as catchment locations for the resource. In this example, the catchment apparatus 120 would define query locations 1-9 (QL1-QL9) as catchment locations for the resource because each of these query locations has a non-zero click-through-rate, and in turn, define the catchment area to include each of the catchment locations, as described in more detail with reference to FIGS. 2B and 3.

The catchment apparatus 120 may alternatively select the query locations for which click-through-rates (or absolute quantity of clicks) exceed a pre-specified catchment threshold as the catchment locations for the resource. For example, if the catchment threshold is 26% the catchment apparatus 120 may select the query locations having a click-through-rate that is greater than 26% as catchment locations for the resource. In this example, the dashed line 208 represents the catchment threshold, such that the catchment apparatus 120 can select query locations 3-6 (QL3-QL6) as catchment locations for the resource. In this example, the query locations 1, 2, and 7-10 (QL1, QL2, and QL7-QL10) will not be selected as catchment locations for the resource because the click-through-rate for each of these query locations is below the catchment threshold of 26%. In turn, the catchment apparatus 120 can define the catchment area for the resource using the catchment locations for the resource (i.e., query locations 3-6).

The catchment apparatus 120 can iteratively process search log data 202 to determine a catchment locations for each resource and define a catchment area using the catchment locations. The catchment area for each resource is determined independent of catchment areas of other resources. The description of FIG. 2A refers to determining catchment areas using impression data, interaction data, and/or query locations. The catchment locations can also be selected without determining an impression count, for example, by analyzing only the search log data that is associated with a user interaction with a search result that references the resource. As described below with reference to FIG. 3, additional data (e.g., obstacle data, prominence data, category data, map interaction data, and other data) can be used to determine and/or adjust catchment areas for resources.

Figure 2B:
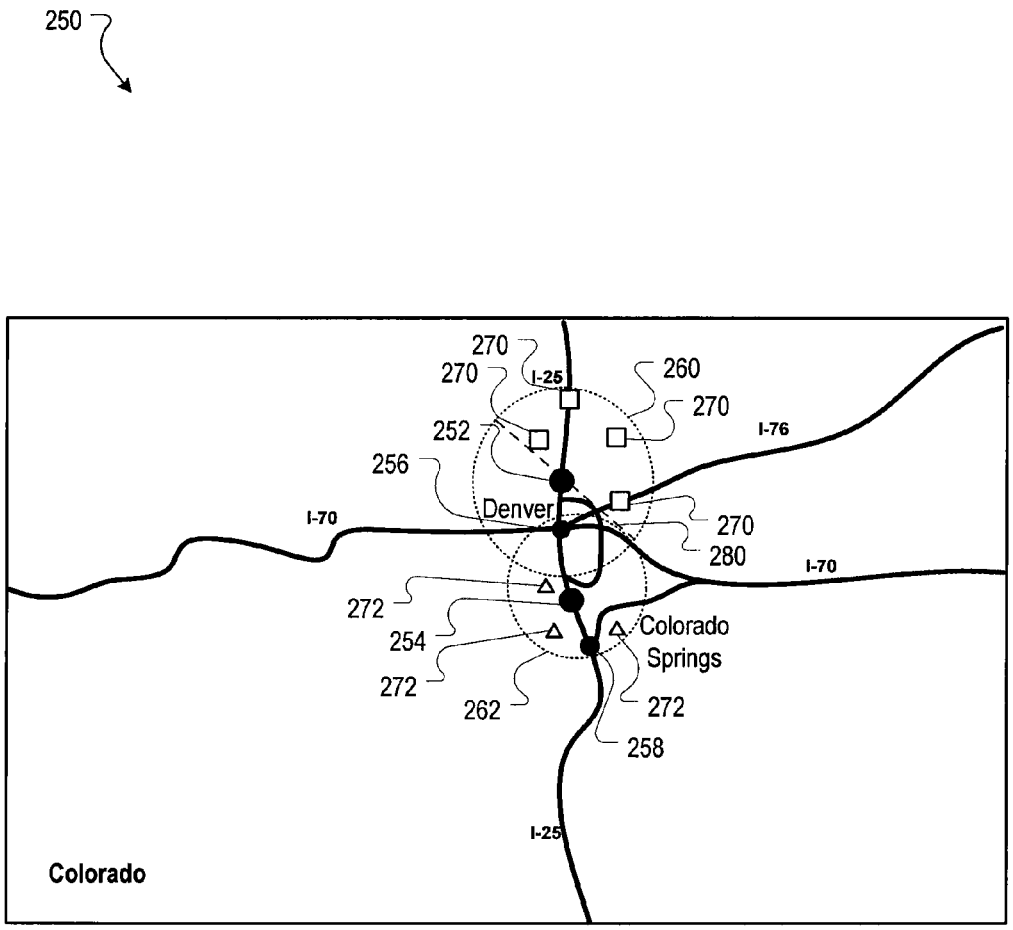
FIG. 2B is an illustration of a map in which catchment areas for resources are depicted.

FIG. 2B is an illustration of a map 250 in which catchment areas for resources are depicted. The map 250 includes a dot 252 representing a business location for one resource and a dot 254 representing a business location for another resource. The map 250 also includes a dot 256 representing the city-center of Denver and another dot 258 representing the city-center of Colorado Springs.

Each of the squares 270 represents a catchment location for a first resource having a business location at the dot 252, and each of the triangles 272 represents a catchment location for a second resource having a business location at the dot 254. Using the catchment locations represented by the squares 270, the catchment area for the first resource can be defined using a circle 260. The circle 260 has a center at the business location at the dot 252 and has a radius that is proportional to (e.g., equal to) the distance between the dot 252 and the square 270 that is furthest from the dot 252. Thus, each of the catchment locations represented by the squares 270 is included in the catchment area for the first resource.

Similarly, using the catchment locations represented by the triangles, the catchment area for the second resource can be defined using a circle 262. The circle 262 has a center that is located at the dot 254 (i.e., the business location for the second resource) and has a radius that is proportional to the distance between the dot 254 and the triangle that is furthest from the dot 254. Thus, each of the catchment locations represented by the triangles 272 is included in the catchment area for the second resource.

The catchment area represented by the circle 260 indicates that the first resource is available to be selected as being responsive to search queries having a query location of Denver and other query locations that are within the dashed circle (e.g., towns or addresses that are within the dashed circle). However, the first resource is not be available to be selected as being responsive to search queries having the query location Colorado Springs, as Colorado Springs is not included in the catchment area represented by the dashed circle 260. Similarly, the catchment area represented by the circle 262 indicates that the second resource is available to be selected as being responsive to a search queries having the query locations Denver or Colorado Springs since the circle 262 includes both cities.

The catchment areas are described with reference to FIG. 2B as having circular edges, but the catchment areas can be defined using other shapes. For example, the catchment area for the first resource could have been defined as a semi-circle that included each of the catchment locations for the resource, as represented by the dashed line 280. Alternatively, the catchment area for the first resource could have been defined using a curve that intersected each of the squares 270 and the dot 260. Catchment areas can also be defined in other ways, as described in more detail with reference to FIG. 3.

Figure 3:
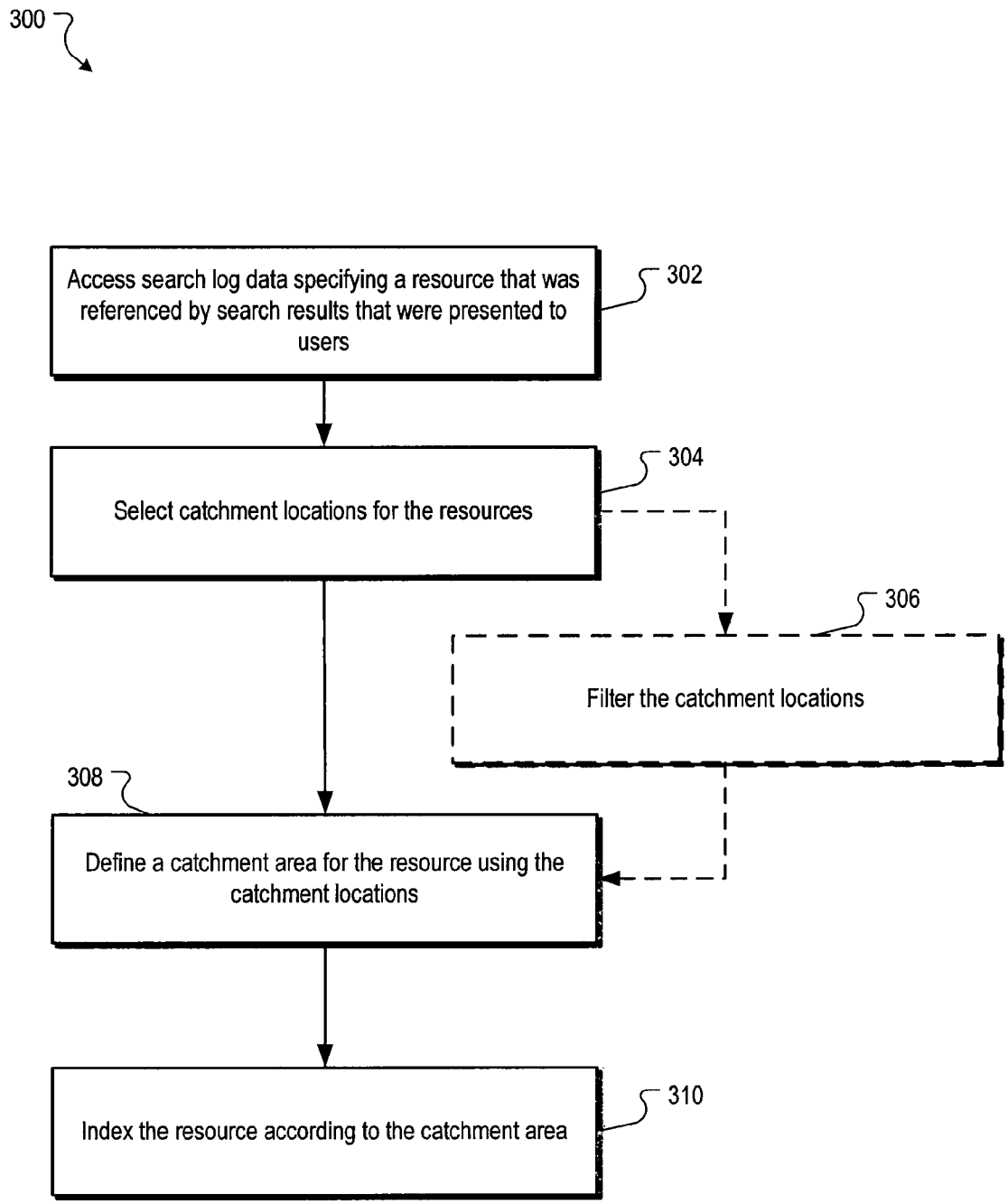
FIG. 3 is a flow chart of an example process for determining catchment areas for resources.

FIG. 3 is a flow chart of an example process 300 for determining catchment areas for resources. The process 300 is a process by which search log data specifying resource that was referenced by search results are received. Using the search log data, a distance between a business location for the resource and at least one query location is determined. In turn, a set of query locations are selected, where the set of query locations are query locations for which the resource has at least a threshold user selection rate. A catchment area is defined for the resource using the set of query locations, and the resource is indexed according to the catchment area. The process 300 can be implemented, for example, by the catchment apparatus 120 and/or the search system 110 of FIG. 1. In some implementations, the catchment apparatus 120 is a data processing apparatus that includes one or more processors that are configured to perform actions of the process 300. In other implementations, a computer readable medium can include instructions that when executed by a computer cause the computer to perform actions of the process 300.

Search log data specifying a resource that was referenced by search results are accessed (302). In some implementations, the search log data include location data specifying query locations for the resource and interaction data specifying whether the users interacted with the search results that referenced the resource. The query locations can be geographic locations that are specified in the search queries. For example, the search query "90210 coffee shops" includes the query location "90210." The query locations can also be geographic locations that are obtained based on a location of the user device from which the search query was received. For example, the query "coffee shops" can be associated with the query location "Atlanta" when the query "coffee shops" is received from a user device located in the city of Atlanta. Further, the query locations can be inferred from the search query. For example, the query location "San Antonio" can be inferred from the search query "coffee shops near the Alamo," because the Alamo is located in San Antonio. Cities are provided as sample query locations, but other geographic identifiers (e.g., geographic coordinates, addresses, states, or countries).

In some implementations, the query location for a search query can be determined based on map data associated with an interactive map. For example, if a user submits a search query while an electronic map is presented, data representing a center location of the map being displayed and/or geographic coordinates of a portion of the map presented can be used as the query location (or to infer the query location) for the search query.

The search log data also include interaction data specifying whether the users interacted with the search results that referenced the resource (e.g., whether the search result was clicked) following presentation of the search results. For example, for each presentation of a search result that referenced the resource, the interaction data can include a "1" indicating that the user clicked the search result, or a "0" indicating that the user did not click the search result. The interaction data can be associated with (i.e., indexed according to and/or stored at a memory location assigned to) the query location for the resource.

Catchment locations for the resource are selected (304). In some implementations, each catchment location is a query location that is associated with (i.e., indexed according to and/or stored at a memory location assigned to) at least one user selection of a search result that references the resource. For example, as described above, San Francisco is a query location for the search query "coffee shops San Francisco." If a search result that references a particular resource is not selected by any users that submitted a search query having San Francisco as a query location, then San Francisco is not a catchment location for that particular resource. However, if a search result that references the particular resource is selected by a user that submitted a search query having San Francisco as a query location, then San Francisco will be a catchment location for the resource.

In some implementations, each catchment location for a resource is a query location that is associated with at least a threshold quantity of user interactions with search results that referenced the resource. For example, as described with reference to FIG. 2A, each catchment location can be required to have per-query-location click-through-rate and/or a per-query-location absolute click quantity that exceeds a catchment threshold.

A catchment area for the resource is defined (306). In some implementations, the catchment area is defined as a geographic region that includes the catchment locations for the resource. As described with reference to FIG. 2B, in some implementations, the catchment area can be a geometric shape that surrounds each of the catchment locations for the resource. For example, the catchment area can be a circle, square, triangle, or another geometric shape that is centered at the business location for the resource and includes the catchment locations.

The size of the geometric shape can be determined, for example, based on distances between the business location and the catchment locations. For example, the distance between the business location and each of the catchment locations can be determined. In turn, the catchment area can be defined so that the distance between the business center and a furthest edge of the geometric shape can have a distance that is proportional to and/or substantially the same as the furthest distance between the business location and a catchment location for the resource. For example, if a circle is used to define the catchment area, a radius of the circle can be proportional to and/or substantially equal to the maximum distance between the business location and a catchment location.

In some implementations, the catchment area can also be defined by a curve that envelops the catchment locations. For example, the catchment area can be defined by defining the edges of the catchment area to obtain a smallest catchment area that still envelops the catchment locations.

In some implementations, the size of the catchment area can be defined and/or adjusted based on one or more catchment size factors. A catchment size factor is a factor that is used to define and/or adjust the size of a catchment area based on one or more catchment attribute values for the resource. Example catchment attributes for a resource include a prominence attribute, a co-location attribute, a category attribute, and a density attribute. Each of these catchment attributes can have catchment size factors that vary according to a value of the catchment attribute for the resource, as described in more detail below. Thus, the size of a catchment for a resource can be increased or decreased according to the values of the catchment attributes. Catchment attribute values for resources can be received, for example, from a data processing apparatus that computes catchment attribute values and/or a data store at which the catchment attribute values are stored.

A prominence attribute is a catchment attribute having a prominence catchment factor value ("prominence value") that is proportional to a distance that users are likely to travel to visit a business referenced by the resource. For example, users are more likely to travel further to visit a famous French restaurant than they will travel to visit a fast-food chain. Thus, the resource for the famous French restaurant is considered to have more prominence than the resource for the fast food chain, such that the prominence value for the resource for the famous French restaurant will be higher than the prominence value for the resource for the fast food chain. Accordingly, all else being equal, the catchment area for the resource for the French restaurant will be larger than that of the resource for the fast food chain when the catchment area is defined using the prominence attribute.

The co-location attribute is a catchment attribute having a co-location catchment factor value ("co-location value") that is proportional to a quantity of other businesses that are located within a threshold distance of the business location for a resource. For example, users may be willing to travel further to visit a coffee shop that is located in a same shopping center as a home improvement store and a department store than they might otherwise be willing to travel to reach a coffee shop. Thus, the co-location value for a resource for a coffee shop that is located in a same shopping center as a home improvement store and a department store will be higher than the co-location value for a coffee shop that is located several miles from the nearest business. Accordingly, all else being equal, when the co-location value is used, the catchment area for a resource for a coffee shop having the higher co-location value will be larger than the catchment area for the resource for the coffee shop with the having the lower co-location value.

The category attribute is a catchment attribute having a category catchment factor value ("category value") that varies according to a category to which the a business referenced by a resource belongs. For example, based on an analysis of search log data, users may be more willing to travel further to arrive at an amusement park than they are willing to travel to arrive at a department store. Thus, each category of a business referenced by a resources (e.g., restaurants, amusement parks, and department stores) can be have a category value that is proportional to a distance that users are likely to travel to visit businesses that belong to the category.

The density attribute is a catchment attribute having a density catchment factor value ("density value") that is inversely proportional to a quantity of businesses that belong to a same category as the business referenced by the resource and that are within a threshold distance of the business referenced by the resource. For example, users in New York City are less likely to travel as far as users in Statesboro, Ga. are willing to travel to reach a coffee shop because there is a higher density of coffee shops in New York City. Thus, the density value for resources for coffee shops in New York City will be lower than the density value for resources for coffee shops in Statesboro.

In some implementations, the catchment area for a resource is initially defined using the business location and the catchment locations as described above, and then adjusted using the catchment factor values. In these implementations, the total area of a catchment area can be proportionally adjusted using the catchment factor values. For example, if an initial catchment area includes 10 square miles and the prominence value for the resource is 1.2, then the catchment area can be increased by 20% to cover 12 square miles. The catchment area can be increased equally in every direction, or can be directionally increased based on a portion of the catchment locations that are located in a certain portion of the catchment area. For example, if a majority of the catchment locations are located in a southern portion of a catchment area, the southern edge of the catchment area can be increased more than other edges of the catchment area.

In some implementations, the selected catchment locations for a resource are filtered to exclude at least one of the catchment locations for the resource (308). In these implementations, the catchment area can be defined for the resource, as described with reference to step 306, using the catchment locations that remain following the filtering (i.e., the filtered set of catchment locations). In other words, the catchment area for the resource can be a geographic area that does not include the excluded catchment locations.

Exclusion of the at least one catchment location can be performed, for example, using obstacle data that specify geographic locations of one or more obstacles. An obstacle is any object that limits navigation from a catchment location to the business location of a resource. Lakes, rivers, mountains, valleys, forests, and non-navigable areas of land (e.g., areas where public access has not been provided) are examples of obstacles. Obstacle data can be obtained, for example, from map data for online maps that is stored in a data store. Using the obstacle data, a determination is made whether an obstacle is located between the business location for the resource and the any of the catchment locations. If an obstacle is located between the business location and a particular catchment location, the particular catchment location can be excluded from the catchment area for the resource to create a set of filtered catchment locations that does not include catchment locations that are located at a geographic location having an obstacle located between the geographic location and the business location for the resource.

In some implementations, the catchment locations for the resource are excluded by defining an edge of the catchment area at substantially a same geographic location as the obstacle. For example, if a mountain range is located between a particular catchment location and the business location, an edge of the catchment area can be defined at an edge of the mountain range that is closest to the business location. The edge of the catchment area can be at substantially the same geographic location as the edge of the mountain range until the edge of the mountain range intersects a road. At this point the catchment area can be defined based, for example, as described above since the obstacle does not impede travel between catchment locations and the business location at the geographic location of the road.

The resource is indexed according to the catchment area (310). In some implementations, the resource is indexed according to the catchment are by being stored at a memory location that has been assigned to the catchment area. In some implementations, the resource is indexed according to the catchment area by being stored with a reference to the catchment area for the resource. Once resources are indexed to catchment area, the resource can be selected as a candidate resource for search queries that have a query location that is located within the catchment area.

Figure 4:
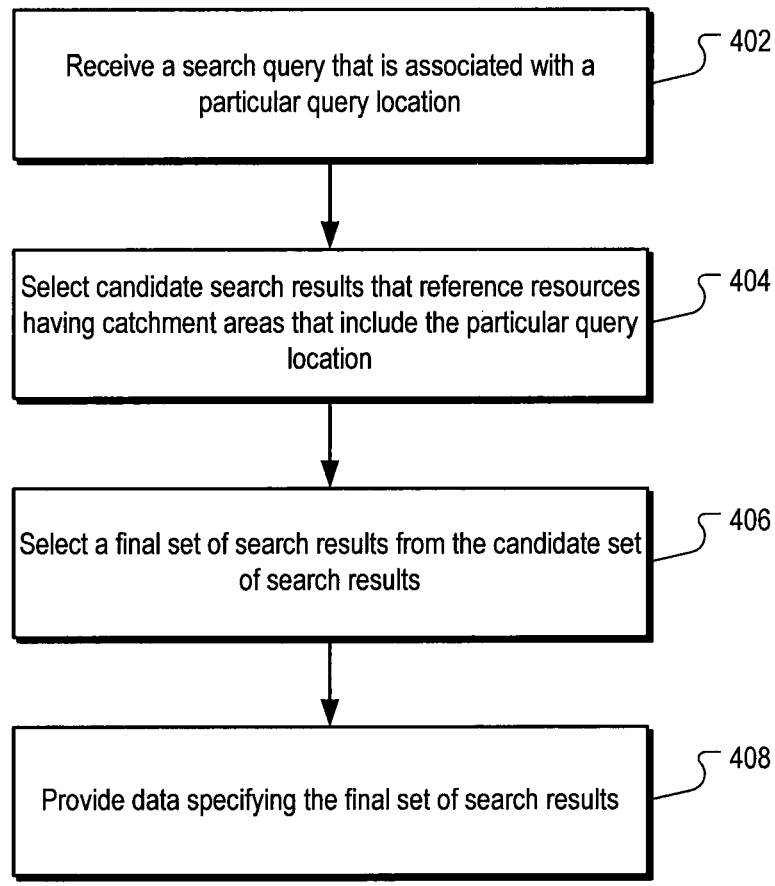
FIG. 4 is a flow chart of an example process for selecting final search results responsive to a search query using catchment areas.

FIG. 4 is a flow chart of an example process 400 for selecting final search results responsive to a search query using catchment areas. The process 400 is a process by which a search query having a particular query location is received. Using the particular query location, candidate search results that reference resources having catchment areas that include the particular query location are selected, and a final set of search results are selected from the candidate search results. In turn, data are provided that cause presentation of at least a portion of the final set of search results.

The process 400 can be implemented, for example, by the catchment apparatus 120 and/or the search system 110 of FIG. 1. In some implementations, the catchment apparatus 120 is a data processing apparatus that includes one or more processors that are configured to perform actions of the process 400. In other implementations, a computer readable medium can include instructions that when executed by a computer cause the computer to perform actions of the process 400.

A search query that is associated with a particular query location is received (402). As described above with reference to FIG. 1, the particular query location can be determined from the contents of the search query and/or a location of the user device from which the search query was received. The search query can be received, for example, by the search system 110 and/or the catchment apparatus 120 of FIG. 1.

Candidate search results that reference resources having catchment areas that include the particular query location are selected (404). In some implementations, at least one candidate search result references a resource that has a catchment area that differs from the catchment areas of other resources that are referenced by the candidate search results. For example, as described above, each search result can reference a resource that has a catchment area that is determined independent of the catchment areas for resources that are referenced by other search results. Thus, in response to receipt of the search query, each search result that references a resource having a catchment area that includes the query location can be selected as a candidate search result irrespective of other geographic locations that are included in the catchment area for the resource.

In some implementations, a candidate search result is generated for each resource having a catchment area that includes the query location. Generating candidate search results in this manner effectively filters the resources that are required to be processed for a particular search query. Thus, the computing resources required to service the search result can be reduced, and/or the time required to identify final search results can be reduced.

A final set of search results are selected from the candidate search results (406). The final set of search results can be selected, for example, according to result scores that are computed based, in part, on the relevance of the resource to the search query as described with reference to FIG. 1.

Data that specify the final set of search results are provided (408). In some implementations, the data that specify the final set of search results are data that cause presentation of the final set of search results according to a ranking of the final set of search results that is based on result scores. For example, the data that specify the final set of search results can be data that cause presentation of at least a portion of the final set of search results on a search results page and according to the ranking of the search results (e.g., in descending order of result score). In some implementations, the data that specify the final set of search results are provided to another data processing apparatus that performs additional computations and/or processing prior to presenting search results to a user that submitted the search query.

As described below with reference to FIGS. 5 and 6, the search results that are provided can also include search results for resources having catchment areas that do not include the query location, but do include a business location of a resource having a catchment area that does include the query location. For example, assume that the query location for the search query "ski" is included in the catchment area for a nearby ski shop, but not included in the catchment area for a ski resort. Further assume that the business location for the ski shop is included in the catchment area for the ski resort. In this example, a search result that references the ski resort may be provided in response to the search query because another search result that has been selected as responsive to the search query has a business location that is included in the catchment area for the ski resort.

Figure 5:
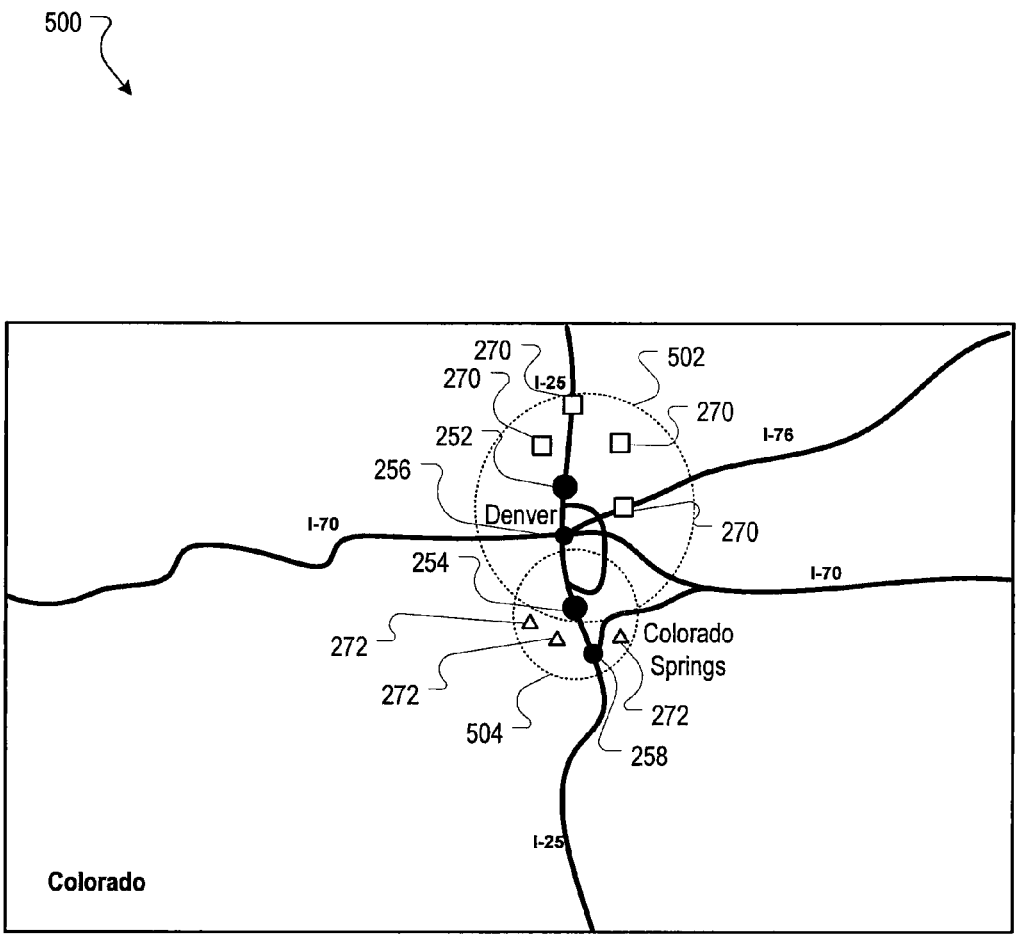
FIG. 5 is an illustration of a map in which catchment areas for resources are depicted.

FIG. 5 is an illustration of a map 500 in which catchment areas for resources are depicted. The map 500 is similar to the map 250 that was described with reference to FIG. 2B. For example, the map 500 includes the dot 252 representing a business location for one resource and the dot 254 representing a business location for another resource. The map 500 also includes the dot 256 representing the city-center of Denver and another dot 258 representing the city-center of Colorado Springs.

Each of the squares 270 represents a catchment location for the resource having the business location at the dot 252 ("the resource for business location 252"), and each of the triangles 272 represents a catchment location for the resource having the business location at the dot 254 ("the resource for business location 254"). In this example, the catchment area for the resource for business location 254 is outlined by circle 504. The catchment area for the resource for business location 252 is outlined by the circle 502 (note the catchment area differs from the circle 260 from FIG. 2B because the catchment area defined by the circle 502 includes the business location 254). The catchment area that is defined by the circle 504 does not include the business location 252.

As noted above, the catchment area represented by the circle 502 indicates that the resource for the business location 252 is available to be selected as being responsive to search queries having a query location of "Denver" and other query locations that are within the dashed circle 502 (e.g., towns or addresses that are within the dashed circle 502). As illustrated by the map 500, Colorado Springs is not included in the catchment area represented by the dashed circle 502. In this example, if responsive resources are required to have catchment areas that include the query location that is associated with the search query, the first resource having business location at the dot 252 may not be selected as being responsive to search queries that include query locations that reference Colorado Springs.

In some implementations, the first resource for the business location 252 may still be selected as a responsive resource for a search query having a query location that references Colorado Springs irrespective of whether the catchment area 502 includes Colorado Springs. For example, assume that a second resource for business location 254 is identified as responsive to the search query having the query location Colorado Springs. In this example, the business location 254 is included in the catchment area for the first resource for business location 252 (e.g., as defined by circle 502). Therefore, the first resource for business location 252 is available to be selected as being responsive to the search query having the query location of Colorado Springs, despite the fact that Colorado Springs is not included in the catchment area that is defined by the circle 502.

Including the first resource for the business location 252 as a responsive resource for a search query having a query location that references Colorado Springs irrespective of whether the catchment area 502 includes Colorado Springs can be based, in part, on the premise that if a user is willing to travel from outside the catchment area 502 to the business location 254, and thus enter the catchment area of 502, the user may be willing to travel farther into the catchment area 502 to the business location 252.

Figure 6:
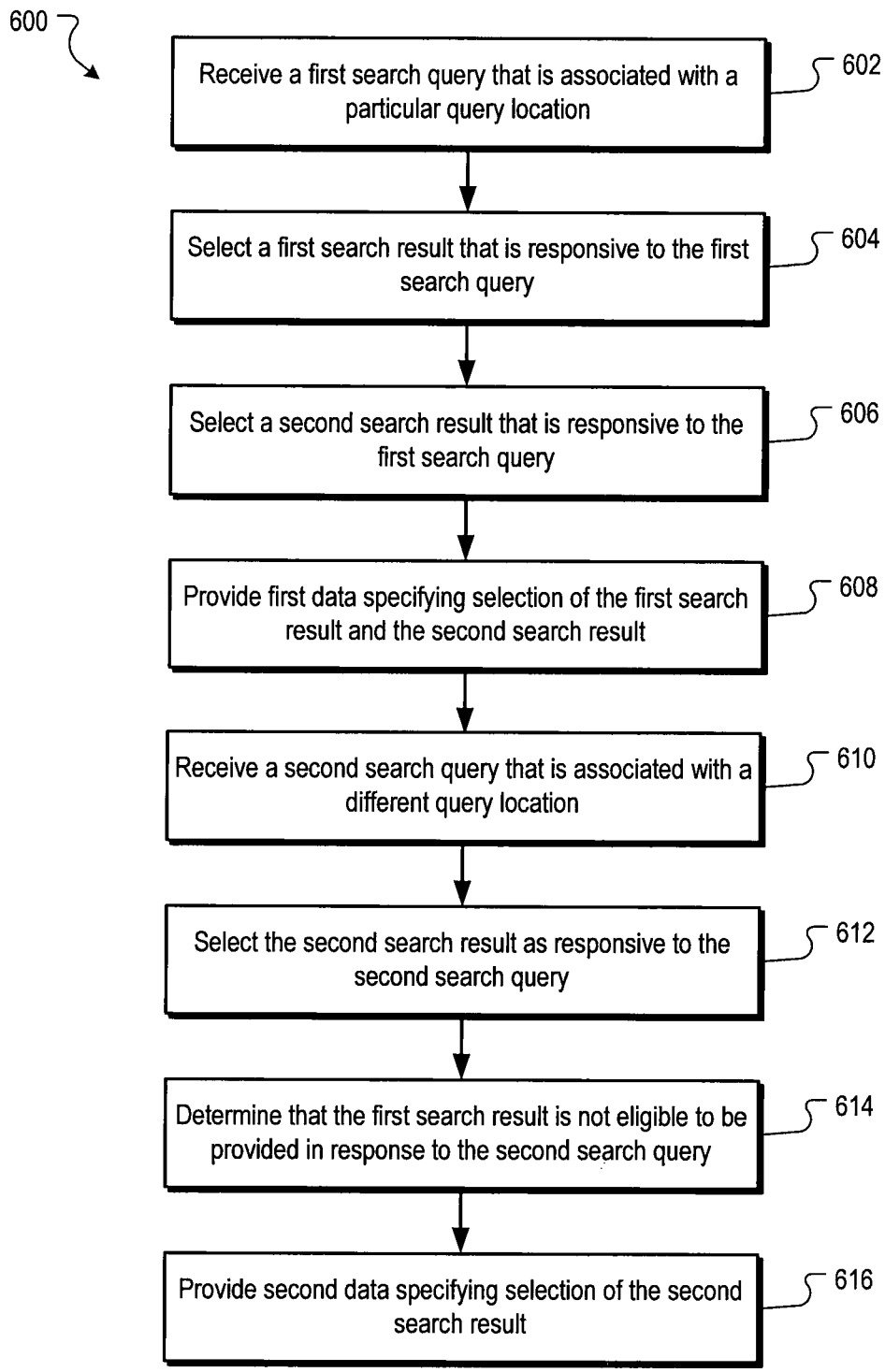
FIG. 6 is a flow chart of an example process for selecting search results using catchment areas.

FIG. 6 is a flow chart 600 of an example process for selecting search results using catchment areas. The process 600 can be implemented, for example, by the catchment apparatus 120 and/or the search system 110 of FIG. 1. In some implementations, the catchment apparatus 120 is a data processing apparatus that includes one or more processors that are configured to perform actions of the process 600. In other implementations, a computer readable medium can include instructions that when executed by a computer cause the computer to perform actions of the process 600.

A first search query is received (602). The first search query is associated with a particular query location. As described above with reference to FIG. 1, the particular query location can be determined from the contents of the search query and/or a location of the user device from which the search query was received. For example, assume that the first search query is the search query "Ski Colorado Springs," which includes the particular query location of "Colorado Springs." The search query can be received, for example, by the search system 110 and/or the catchment apparatus 120 of FIG. 1.

A first search result that is responsive to the first search query is selected (604). In some implementations, the first search result references a first resource that has a first catchment area. The first catchment area is a catchment area that includes the particular query location. Continuing with the example above, the first search result can be a search result for the resource that is associated with the business location 254 in FIG. 5, since the catchment area 504 for this resource includes the particular query location "Colorado Springs."

A second search result that is responsive to the first search query is selected (606).

The second search result references a second resource that has a second catchment area. The second catchment area does not include the particular query location, but does include the business location for the first resource. Continuing with the example above, the second search result can be a search result for the resource that is associated with the business location 252 in FIG. 5, since the catchment area defined by the circle 502 includes the business location 254 and the first search result is associated with the business location 254.

In some implementations, the second search result can be required to have at least a threshold similarity score relative to the first resource. For example, a cosine similarity (or another measure of resource similarity) measure between features of the first resource and the second resource can be required to have at least a minimum pre-specified value.

In some implementations, the result score for the second search result can be adjusted based on the second catchment area not including the particular query location. For example, the result score for the second search result can be lowered (e.g., relative to the result score for the first search result) to indicate that the second search result was included, based at least in part, on its relationship with the first search result. This result score adjustment can reflect a preference for selection (or higher ranking) of search results having catchment areas that include the particular query location over search results having catchment areas that do not include the particular query location.

First data specifying selection of the first search result and the second search result as responsive to the first search query are provided (608). In some implementations, the first data cause presentation of the first search result and second search result in a search results page. The first search result and the second search result can be presented according to result scores for the first and second search results. In some implementations, the first data are provided to another data processing apparatus that performs additional computations and/or processing prior to providing the search results to a user device from which the search query was received.

The selection of resources based on the catchment areas is, in part, dependent on the query location. For example, if another query is received with the query location for Denver instead of Colorado Springs, the resulting resources that are selected may differ than from the resources that are selected for the query with the query location of Colorado Springs. This is illustrated with respect to 610-616 below.

A second search query is received (610). The second search query is associated with a different query location (e.g., a query location that is different than the particular query location from 602 above). As described above with reference to FIG. 1, the different query location can be determined from the contents of the search query and/or a location of the user device from which the search query was received. For example, assume that the second search query is the search query "Ski Denver," which includes the query location of "Denver" rather than "Colorado Springs." The second search query can be received, for example, by the search system 110 and/or the catchment apparatus 120 of FIG. 1.

The second search result is selected as responsive to the second search query (612). In some implementations, the second search result is selected as responsive to the second search query, based at least in part, on the second catchment area including the different query location. For example, with reference to FIG. 5, assume that the resource for location 254 is identified as responsive to the second search query, based at least in part, on the catchment area that is outlined by circle 504 including the city of Denver. As described with reference to FIG. 1, the second search result can be identified as responsive to the second search query based, in part, on the result score for the second search result.

A determination is made that the first search result references the first resource that has a first catchment area 504 is not eligible to be provided in response to the second search query (614). In some implementations, the determination is made based on a determination that the first catchment area does not include the different query location. For example, with reference to FIG. 5, when the different query location is "Denver," the catchment area that is outlined by the circle 504 will not include the different query location. In some implementations, the determination is made based on a determination that the first catchment area does not include a business location of the second resource. For example, with reference to FIG. 5, assume that the second resource has the business location 252, and that the first resource has the business location 254. In this example, the catchment area that is outlined by the circle 504 does not include the business location 252, such that the catchment area for the first resource ("first catchment area") does not include the business location of the second resource (e.g., business location 252).

Second data specifying selection of the second search result in response to the second search query are provided (616). In some implementations, the second data do not include data that identify the first search result as being responsive to the second search query. For example, the second data can cause presentation of the second search result (but not the first search result) in a search results page. The second search result can be presented according to a result score for second search result relative to result scores for other search results that may also have been selected as being responsive to the second search result. In some implementations, the second data are provided to another data processing apparatus that performs additional computations and/or processing prior to providing the search results to a user device from which the second search query was received.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

receiving a first search query that is associated with a particular query location;

selecting a first search result that is responsive to the first search query, the first search result referencing a first resource having a first catchment area that includes the particular query location;

selecting a second search result that is responsive to the first search query based on a result score, the second search result referencing a second resource having a second catchment area that does not include the particular query location, the second catchment area including a business location of the first resource, wherein selecting a second search result further comprises adjusting the result score for the second search result based on the second catchment area not including the particular query location; and providing first data specifying selection of the first search result and the second search result in response to the search query.

2. The method of claim 1, wherein selecting a second search result comprises selecting the second search result based on the second resource having at least a threshold similarity score relative to the first resource.

3. The method of claim 1, wherein each catchment area includes a plurality of catchment locations for a resource, each catchment location being a query location that is associated with at least one user selection of a search result that references the resource.

4. The method of claim 1, wherein the first catchment area does not include a business location of the second resource.

5. The method of claim 4, further comprising:

receiving a second search query that is associated with a different query location;

selecting the second search result as responsive to the second search query, the second search result being selected, at least in part, based on the second catchment area including the different query location;

determining that the first catchment area does not include the different query location; and providing second data specifying selection of the second search result in response to the second search query, wherein the second data does not include data identifying the first search result.

6. The method of claim 1, further comprising:

accessing search log data specifying that the first resource is referenced by search results that were presented to users, query locations for the first resource, and whether the users interacted with the search results;

determining the first catchment area for the first resource based on the search log data; and indexing the first resource according to the first catchment area.

7. The method of claim 1, further comprising:

accessing search log data specifying that the second resource is referenced by search results that were presented to users, query locations for the second resource, and whether the users interacted with the search results;

determining the second catchment area for second first resource based on the search log data; and indexing the second resource according to the second catchment area.

8. A computer storage medium encoded with a computer program, the program comprising instructions that when executed by data processing apparatus cause the data processing apparatus to perform operations comprising:

receiving a first search query that is associated with a particular query location;

selecting a first search result that is responsive to the first search query, the first search result referencing a first resource having a first catchment area that includes the particular query location;

selecting a second search result that is responsive to the first search query based on a result score, the second search result referencing a second resource having a second catchment area that does not include the particular query location, the second catchment area including a business location of the first resource wherein selecting a second search result further comprises adjusting the result score for the second search result based on the second catchment area not including the particular query location; and providing first data specifying selection of the first search result and the second search result in response to the search query.

9. The computer storage medium of claim 8, wherein the first catchment area does not include a business location of the second resource.

10. The computer storage medium of claim 9, wherein the computer program further comprises instructions that when executed by the data processing apparatus cause the data processing apparatus to perform operations comprising:

receiving a second search query that is associated with a different query location;

selecting the second search result as responsive to the second search query, the second search result being selected, at least in part, based on the second catchment area including the different query location;

determining that the first catchment area does not include the different query location; and providing second data specifying selection of the second search result in response to the second search query, wherein the second data does not include data identifying the first search result.

11. A system comprising:

a user device; and one or more computers operable to interact with the device and to:

receiving a first search query that is associated with a particular query location;

selecting a first search result that is responsive to the first search query, the first search result referencing a first resource having a first catchment area that includes the particular query location;

selecting a second search result that is responsive to the first search query based on a result score, the second search result referencing a second resource having a second catchment area that does not include the particular query location, the second catchment area including a business location of the first resource wherein selecting a second search result further comprises adjusting the result score for the second search result based on the second catchment area not including the particular query location; and providing first data specifying selection of the first search result and the second search result in response to the search query.

12. The system of claim 11, wherein the one or more computers comprise a server operable to interact with the device through a data communication network, and the device is operable to interact with the server as a client.

13. The system of claim 11, wherein the one or more computers are further operable to perform operations comprising selecting the second search result based on the second resource having at least a threshold similarity score relative to the first resource.

14. The system of claim 11, wherein each catchment area includes a plurality of catchment locations for a resource, each catchment location being a query location that is associated with at least one user selection of a search result that references the resource.

15. The system of claim 11, wherein the first catchment area does not include a business location of the second resource.

16. The system of claim 15, wherein the one or more computers are further operable to perform operations comprising:

receiving a second search query that is associated with a different query location;

selecting the second search result as responsive to the second search query, the second search result being selected, at least in part, based on the second catchment area including the different query location;

determining that the first catchment area does not include the different query location; and providing second data specifying selection of the second search result in response to the second search query, wherein the second data does not include data identifying the first search result.

17. The system of claim 11, wherein the one or more computers are further operable to perform operations comprising:

accessing search log data specifying that the first resource is referenced by search results that were presented to users, query locations for the first resource, and whether the users interacted with the search results;

determining the first catchment area for the first resource based on the search log data; and indexing the first resource according to the first catchment area.

18. The system of claim 11, wherein the one or more computers are further operable to perform operations comprising:

accessing search log data specifying that the second resource is referenced by search results that were presented to users, query locations for the second resource, and whether the users interacted with the search results;

determining the second catchment area for second first resource based on the search log data; and indexing the second resource according to the second catchment area.

* * * * *